(12) United States Patent
Maruyama et al.

(10) Patent No.: US 7,687,562 B2
(45) Date of Patent: Mar. 30, 2010

(54) POLYAMIDE RESIN COMPOSITION

(75) Inventors: Gaku Maruyama, Tsuruga (JP); Kenta Susuki, Tsuruga (JP); Makoto Ito, Tsuruga (JP); Kazuo Katayose, Tsuruga (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 472 days.

(21) Appl. No.: 10/584,268

(22) PCT Filed: Dec. 21, 2004

(86) PCT No.: PCT/JP2004/019054

§ 371 (c)(1),
(2), (4) Date: Apr. 12, 2007

(87) PCT Pub. No.: WO2005/063888

PCT Pub. Date: Jul. 14, 2005

(65) Prior Publication Data

US 2008/0039568 A1   Feb. 14, 2008

(30) Foreign Application Priority Data

Dec. 26, 2003  (JP) .............................. 2003-435790
Dec. 26, 2003  (JP) .............................. 2003-435792

(51) Int. Cl.
*C08K 3/32*     (2006.01)
*C08G 69/26*    (2006.01)

(52) U.S. Cl. .................. 524/414; 528/347; 528/335; 528/348; 524/599; 524/606; 524/417; 524/424

(58) Field of Classification Search ................ 528/347; 524/414, 415
See application file for complete search history.

(56) References Cited

U.S. PATENT DOCUMENTS

| | | | | |
|---|---|---|---|---|
| 3,536,804 A | * | 10/1970 | Fujimoto et al. | 264/210.6 |
| 3,872,055 A | * | 3/1975 | Furukawa et al. | 524/112 |
| 5,416,189 A | * | 5/1995 | Vandevijver et al. | 528/347 |
| 6,191,251 B1 | * | 2/2001 | Pagilagan | 528/313 |
| 6,303,741 B1 | * | 10/2001 | Tanaka | 528/332 |

FOREIGN PATENT DOCUMENTS

| | | |
|---|---|---|
| EP | 0 596 702 A | 5/1994 |
| EP | 1 344 799 A | 9/2003 |
| EP | 1 354 906 A | 10/2003 |
| EP | 1 516 892 A | 3/2005 |
| JP | 45-11836 A | 4/1970 |
| JP | 45-12986 A | 5/1970 |
| JP | 45-35667 A | 11/1970 |
| JP | 46-38351 A | 11/1971 |
| JP | 49-5394 A | 5/1974 |
| JP | 49-45960 A | 5/1974 |
| JP | 49-53945 A | 5/1974 |
| JP | 2000-234021 A | 8/2000 |
| JP | 2000-345031 A | 12/2000 |
| JP | 2001-164109 A | 6/2001 |
| JP | 2003-105095 A | 4/2003 |
| JP | 2003-212992 A | 7/2003 |
| JP | 2003-252986 A | 9/2003 |
| JP | 2003-29193 A | 10/2003 |
| JP | 2003-291938 A | 10/2003 |
| JP | 2004-91595 A | 3/2004 |

OTHER PUBLICATIONS

Supplementary Partial Search Report issued on Jan. 7, 2008 in corresponding European patent application No. 04807411.
International Search Report of PCT/JP2004/019054, date of mailing Feb. 22, 2005.

* cited by examiner

*Primary Examiner*—Randy Gulakowski
*Assistant Examiner*—Rachel Kahn
(74) *Attorney, Agent, or Firm*—Westerman, Hattori, Daniels & Adrian, LLP

(57) ABSTRACT

The present invention relates to such a polyamide resin composition that is suitably used as a material of a gasoline tank and a material of a molded article, such as a hollow molded container including a beverage bottle, a film and a sheet. A polyamide resin that is good in heat stability upon molding and suffers less increase in filter back pressure is provided by regulating a polyamide resin composition to have a phosphorus content of from 30 to 200 ppm (excluding 200 ppm), and a sodium content/phosphorus content ratio (molar ratio) of from 3 to 7 (excluding 3 and 7) or regulating it to have a phosphorus content less than 30 ppm and an alkali metal content less than 45 ppm.

8 Claims, No Drawings

POLYAMIDE RESIN COMPOSITION

TECHNICAL FIELD

The present invention relates to such a polyamide resin composition that is suitably used as a material of a gasoline tank and a material of a molded article, such as a hollow molded container including a beverage bottle, a film and a sheet. It also relates to such a polyamide resin composition that is good in heat stability upon molding, is excellent in color tone, suffers less increase in filter back pressure, and is excellent in productivity.

BACKGROUND ART

Polyamide is being widely used in such purposes as a hollow molded container, a film, a sheet wrapping material, engineering plastics and fibers owing to the excellent physical and mechanical characteristics thereof. Representative examples thereof include an aliphatic polyamide, such as nylon 66, and in addition, a number of kinds of polyamide have been known that use an aromatic diamine, such as p-xylenediamine (PXDA) and m-xylylenediamine (MXDA), as a starting material to realize reduction in water absorptivity and improvement in elastic modulus.

Polyamide is relatively unstable to heat as compared to polyester and the like, and sometimes suffers gelation, yellowing and the like due to heat deterioration and thermal oxidation deterioration.

As a measure for suppressing polyamide from suffering heat deterioration, such a method is proposed that a phosphonic acid compound or a phosphorous acid compound, and an alkali metal are added to polyamide (see, for example, Patent Document 1).

As a measure for suppressing polyamide from suffering heat deterioration, such a method is proposed that a phosphinic acid compound, a phosphorous acid compound or a phosphonic acid compound, and an alkali metal are added to polyamide, and phenylenediamine and/or a derivative thereof is added to polyamide in an amount of from 0.01 to 2% by weight (see, for example, Patent Document 2).

As a measure for preventing polyamide from suffering heat deterioration at a melting point thereof or lower in a system having no oxygen present therein, such a method is proposed that a pyrophosphite salt, an amide compound of an organic phosphinic acid, a barium salt of a monoester or diester of phosphorous acid, a copper salt of a monoester or diester of orthophosphoric acid, or the like is added (see, for example, Patent Documents 3, 4, 5 and 6).

As a measure for preventing a gelled product of polyamide formed from m xylylenediamine and adipic acid from occurring, it is considered that at least one kind selected from a lubricant, an organic phosphorus stabilizer, a hindered phenol compound and a hindered amine compound is added in an amount of from 0.0005 to 0.5 part by weight (see, for example, Patent Document 7).

These measures exert effect for preventing gelation due to a network structure in polyamide, but a finer filter is being used on molding a resin for purposes requiring increased precision in recent years, which brings about such a problem that a filter is often clogged, and thus is necessarily exchanged frequently.

Patent Document 1: JP-A-49-45 960

Patent Document 2: JP-A-49-53945

Patent Document 3: JP-B-45-11836

Patent Document 4: JP-B-45-35667

Patent Document 5: JP-B-45-12986

Patent Document 6: JP-B-46-38351

Patent Document 7: JP-A-2001-164109

PROBLEMS TO BE SOLVED BY THE INVENTION

The invention relates to such a polyamide resin composition that is suitably used as a material of a gasoline tank and a material of a molded article, such as a hollow molded container including a beverage bottle, a film and a sheet. It is also to provide a polyamide resin composition that is suppressed in filter clogging and is hard to suffer yellowing due to heat deterioration on polymerization and molding by containing such a polyamide resin that is good in heat stability upon polymerization and molding, is excellent in color tone with less degree of yellowing, suffers less increase in filter back pressure, and is excellent in productivity.

MEANS FOR SOLVING THE PROBLEMS

1. A polyamide resin composition containing mainly m-xylylenediamine (MXDA) as a diamine component and mainly adipic acid (AA) as a dicarboxylic acid component, wherein the polyamide resin composition has a back pressure increasing coefficient $K^*$ satisfying the following equation (1):

$$0 < K^* < 15 \tag{1}$$

wherein $K^*$ represents a back pressure increasing coefficient expressed by the following equation:

$$K^* = [\Delta P(\text{MPa})/T(\text{hr})]/[Q(\text{kg/hr})/S(\text{cm}^2)]$$

wherein $\Delta P$ (MPa) represents a difference between an initial secondary pressure of a gear pump and a secondary pressure thereof after a lapse of $T$ (hr); $T$ (hr) represents a period of time of filtering the polyamide resin composition with a filter; $Q$ (kg/hr) represents a discharge amount of the polyamide resin composition; $S$ (cm$^2$) represents a filtering area of the filter; and the filter has a filtering diameter of 20 μm.

2. The polyamide resin composition described in the item 1, wherein the polyamide resin composition has a back pressure increasing coefficient $K^*$ satisfying the following equation (2):

$$0 < K^* < 5 \tag{2}$$

wherein $K^*$ represents a back pressure increasing coefficient expressed by the following equation:

$$K^* = [\Delta P(\text{MPa})/T(\text{hr})]/[Q(\text{kg/hr})/S(\text{cm}^2)]$$

wherein $\Delta P$ (MPa) represents a difference between an initial secondary pressure of a gear pump and a secondary pressure thereof after a lapse of $T$ (hr); $T$ (hr) represents a period of time of filtering the polyamide resin composition with a filter; $Q$ (kg/hr) represents a discharge amount of the polyamide resin composition; $S$ (cm$^2$) represents a filtering area of the filter; and the filter has a filtering diameter of 20 μm.

3. A polyamide resin composition containing mainly m xylylenediamine (MXDA) as a diamine component and mainly adipic acid (AA) as a dicarboxylic acid component, the polyamide resin composition having contents of phosphorus atoms (P) and sodium atoms (Na) satisfying the following equations (3) and (4):

$$30 \leq P < 200 \text{ ppm} \quad (3)$$

$$3.0 < \text{Na/P (molar ratio)} < 7.0 \quad (4)$$

4. The polyamide resin composition as described in the item 3, wherein the polyamide resin composition has a Co-b value satisfying the following equation (5):

$$-3 < \text{Co-b} < 10 \quad (5)$$

5. A polyamide resin composition containing mainly m xylylenediamine (MXDA) as a diamine component and mainly adipic acid (AA) as a dicarboxylic acid component, the polyamide resin composition having contents of phosphorus atoms (P) and an alkali metal (M) satisfying the following equations (6) and (7):

$$0 \leq P < 30 \text{ ppm} \quad (6)$$

$$0.1 \leq M < 45 \text{ ppm} \quad (7)$$

wherein M represents an alkali metal species, such as Na, Li and K.

6. The polyamide resin composition as described in the item 5, wherein the polyamide resin composition has a Co-b value satisfying the following equation (8):

$$3 < \text{Co-b} < 10 \quad (8)$$

ADVANTAGE OF THE INVENTION

The polyamide resin composition of the invention is good in heat stability upon molding, is excellent in color tone, and suffers less increase in filter back pressure. The invention is suitably used as a material of a gasoline tank and a material of a molded article, such as a hollow molded container including a beverage bottle, a film and a sheet, and can produce it with high productivity.

BEST MODE FOR CARRYING OUT THE INVENTION

Embodiments of the polyamide resin composition of the invention will be described in detail.

As the dicarboxylic acid component of the polyamide resin composition used in the invention, adipic acid is mainly used, and in addition, one kind or two or more kinds of an aliphatic dicarboxylic acid, such as sebacic acid, suberic acid, azelaic acid, undecanoic acid, undecanedioic acid and dimer acid, and an aromatic dicarboxylic acid, such as terephthalic acid, isophthalic acid, orthophthalic acid, xylylenedicarboxylic acid and naphthalenedicarboxylic acid, may be used in an arbitrary proportion.

A polyamide resin contained in the polyamide resin composition of the invention contains mainly adipic acid as a dicarboxylic acid component, and preferably contains in an amount of 80% by mole or more, more preferably 90% by mole or more, and further preferably 95% by mole or more.

As the diamine component of the polyamide resin composition, m-xylylenediamine is mainly used, and in addition, an aliphatic diamine compound, such as ethylenediamine, 1-methylethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine and dodecamethylenediamine, an alicyclic diamine compound, such as cyclohexanediamine and bis-(4, 4'-aminohexyl)methane, and an aromatic diamine compound, such as p-xylylenediamine and p-bis-(2-aminoethyl)benzene, may be used.

One kind or two or more kinds of the diamine may be used in an arbitrary proportion.

The polyamide resin contained in the polyamide resin composition of the invention contains mainly m-xylylenediamine as a diamine component, and preferably contains in an amount of 80% by mole or more, more preferably 90% by mole or more, and further preferably 95% by mole or more.

In addition to the aforementioned diamine and dicarboxylic acid, a lactam compound, such as ε-caprolactam and laurolactam, an aminocarboxylic acid compound, such as aminocaproic acid and aminoundecanoic acid, an aromatic aminocarboxylic acid, such as p-aminomethylbenzoic acid, and the like may be used as a copolymerization component. Among these, ε-caprolactam is preferably used.

Examples of a polymer capable of being contained in the polyamide resin composition of the invention include a homopolymer, such as poly-m-xylyleneadipamide, a m-xylylenediamine/adipic acid/isophthalic acid copolymer, and a m-xylylene/p-xylyleneadipamide copolymer.

In order to obtain a polyamide resin composition of the invention having a low back pressure coefficient K* and good color tone, the contents of metals and the like in the polyamide resin composition are preferably that phosphorus atoms (P) and sodium atoms (Na) satisfy the ranges of the following equations (3) and (4) (embodiment A):

$$30 \leq P < 200 \text{ ppm} \quad (3)$$

(ppm: amount (mg) per 1 kg of polymer)

$$3.0 < \text{Na/P (molar ratio)} < 7.0 \quad (4)$$

The lower limit of the content of phosphorus atoms (P) in the embodiment A is more preferably 40 ppm or more, further preferably 50 ppm or more, particularly preferably 60 ppm or more, and most preferably 70 ppm or more. The upper Limit thereof is preferably 170 ppm or less, more preferably 160 ppm or less, further preferably 150 ppm or less, and particularly preferably 130 ppm or less. In the case where the content of phosphorus atoms is too small, the heat stability may be lowered, and the color tone of the polymer may be deteriorated. In the case where the content of phosphorus atoms is too large, on the other hand, the raw material cost for the additive is increased to cause increase in production cost, and the filter is often clogged with foreign matter, which brings about such a possibility that the productivity is deteriorated.

The lower limit of the Na/P molar ratio is more preferably 3.5 or more, further preferably 4.0 or more, and particularly preferably 4.5 or more. The upper limit thereof is more preferably 6.5 or less, further preferably 6.0 or less, and still further preferably 5.5 or less. In the case where Na/P molar ratio is too small, the viscosity is considerably increased, such a risk is increased that gelled products are mixed in upon molding, and the back pressure upon melt filtering may be increased. In the case where the Na/P molar ratio is too large, on the other hand, the polymerization reaction rate may be decreased severely, and the productivity may be deteriorated.

There are such cases that alkali metals are avoided for applying to an electronic material or the like, and slight bleed out of a phosphorus compound to the surface is avoided. In these cases, as one embodiment of the invention, the contents of phosphorus atoms (P) and an alkali metal (M) of the polyamide of the invention preferably satisfy the following equations (6) and (7) (embodiment B):

$$0 \leq P < 30 \text{ ppm} \quad (6)$$

(ppm: amount (mg) per 1 kg of polymer)

$$0.1 \leq M < 45 \text{ ppm} \quad (7)$$

wherein M represents an alkali metal species, such as Na, Li and K.

The lower limit of the content of phosphorus atoms (P) in the embodiment B is more preferably 1 ppm or more, further preferably 3 ppm or more, and particularly preferably 5 ppm or more. The upper limit thereof is preferably 25 ppm or less, more preferably 20 ppm or less, further preferably 15 ppm or less, particularly preferably 12 ppm or less, and most preferably 9 ppm or less. The lower limit of the content of an alkali metal (M) is more preferably 1 ppm or more, further preferably 3 ppm or more, and particularly preferably 5 ppm or more. The upper limit thereof is preferably 40 ppm or less, more preferably 35 ppm or less, further preferably 30 ppm or less, still further preferably 25 ppm or less, yet further preferably 20 ppm or less, particularly preferably 15 ppm or less, and still particularly preferably 10 ppm or less. In the production process, the number of cleaning operation of a reaction vessel may be increased, ion exchange of water in a cooling step should be sufficiently carried out, and ion exchanged water or distilled water should be used as water for dissolving the raw materials, which bring about considerable increase in cost. In the case where the content of phosphorus atoms or an alkali atom is too large, the raw material cost for the additive is increased to cause increase in production cost, and the frequency of filter clogging with the additive upon filtering is increased, which may bring about deterioration in productivity.

The content ratio between the phosphorus compound and the alkali metal compound may be an arbitrary value as far as the contents of them are within the ranges defined in the invention.

Examples of the compound containing a phosphorus atom in the polyamide resin composition used in the invention include compounds represented by the following chemical formulae (C 1) to (C 4).

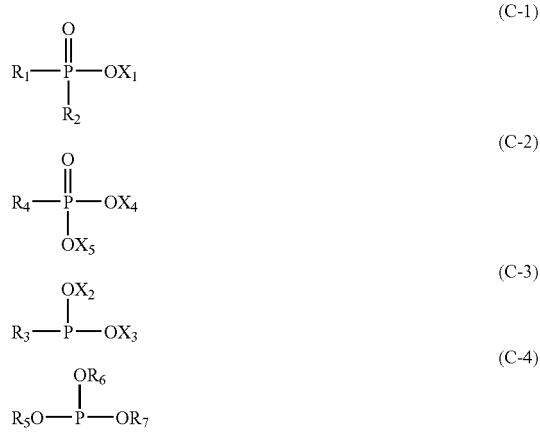

wherein $R_1$ to $R_7$ each represents a hydrogen atom, an alkyl group, an aryl group, a cycloalkyl group or an arylalkyl group; and $X_1$ to $X_5$ each represents a hydrogen atom, an alkyl group, an aryl group, a cycloalkyl group, an arylalkyl group or an alkali metal, provided that one of $R_1$ to $R_7$ and one of $X_1$ to $X_5$ may be bonded to form a cyclic structure.

Examples of a phosphinic acid compound represented by the chemical formula (C-1) include dimethylphosphinic acid, phenylmethylphosphinic acid, hypophosphorous acid, sodium hypophosphite, ethyl hypophosphite, the following compounds:

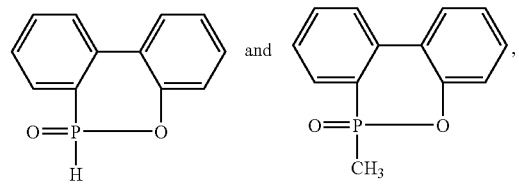

a hydrolyzed product thereof, and a condensate of the phosphinic acid compound.

Examples of a phosphonous acid compound represented by the chemical formula (C-2) include phenylphosphonous acid, sodium phenylphosphonite and ethyl phenylphosphonite.

Examples of a phosphonic acid compound represented by the chemical formula (C-3) include phenylphosphonic acid, ethylphosphonic acid, sodium phenylphosphonate, diethyl phenylphosphonate and sodium ethylphosphonate.

Examples of a phosphorous acid compound represented by the chemical formula (C-4) include phosphorous acid, sodium hydrogenphosphite, sodium phosphite, triethyl phosphite, triphenyl phosphite and pyrophosphorous acid.

Examples of a sodium metallic compound capable of being used in the polyamide resin composition of the invention include sodium hydroxide, sodium acetate, sodium methoxide, sodium ethoxide, sodium propoxide, sodium butoxide and sodium carbonate, and among these, sodium hydroxide and sodium acetate are preferably used, but the invention is not limited to these compounds.

Examples of the alkali metal include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide and sodium carbonate, but the invention is not limited to these compounds.

In order to mix the phosphorus atom-containing compound in the polyamide resin composition of the invention, it may be added to a raw material before polymerization of polyamide or during polymerization, or may be melt-mixed with the polymer. In order to prevent polyamide from suffering heat deterioration upon solid phase polymerization, it is preferred that the phosphorus atom-containing compound is added before starting polymerization.

The color b (Co-b) value upon molding the polyamide resin composition of the invention to chips preferably satisfies the following equation (5):

$$-3 < \text{Co-b} < 10 \quad (5)$$

The upper limit of the Co-b value in the embodiment A is preferably 5, more preferably 4, further preferably 3, and particularly preferably 2. In the case where the Co-b value is too high, yellowing occurring on a post-process of a bottle, a film, fibers or the like is outstanding, which may brings about deterioration in quality of products. In the case where the Co-b value is decreased excessively, the addition amount of a stabilizer, such as a phosphorus atom-containing compound, may be too large, whereby it is disadvantageous in cost, and filter clogging may occur due to the additive. In order to make the Co-b value within the aforementioned range, the addition amounts of the phosphorus atom-containing compound and the sodium metallic compound may be optimized, and furthermore such measures may be employed that the upper limit of the temperature on reaction is 270° C. or less, preferably 265° C. or less, and more preferably 260° C. or less, and the oxygen concentration on reaction is preferably 200 ppm or less, more preferably 150 ppm or less, and further preferably 100 ppm or less.

While there are cases where certain coloration is observed in the embodiment B, the color b (Co-b) value upon molding the polyamide resin composition of the invention to chips preferably satisfies the following equation (8):

$$3 < Co\text{-}b < 10 \qquad (8)$$

The upper limit of the Co-b value is preferably 9, more preferably 8, further preferably 7, and particularly preferably 5. In the case where the Co-b value is decreased excessively, the addition amount of a stabilizer, such as a phosphorus atom-containing compound, may be too large, whereby it is disadvantageous in cost, and filter clogging may occur due to the additive. In the case where the Co-b value is too high, yellowing occurring on a post-process of a bottle, a film, fibers or the like is outstanding, which may brings about deterioration in appearance performance of products. In the case where color b value is 5 or more and less than 10, a molded article has slightly yellowish appearance and has slightly yellowish appearance. Therefore, it is difficult to use as a molded article for a purpose that is not allowed to have yellowish appearance (such as products having white to blue appearance), but may be used without problem as a molded article for a purpose that prefers yellowish appearance or that is allowed to have yellowish appearance (such as products having yellow to black appearance and products with no requirement in appearance performance), which provides industrial significance.

The polyamide resin composition of the invention can be produced by a method of reacting an aqueous solution of an aminocarboxylate salt formed from a diamine and a dicarboxylic acid by heating under increased pressure or ordinary pressure, or a method of directly reacting a diamine and a dicarboxylic acid by heating under ordinary pressure. Chips of the polyamide obtained through the melt-polycondensation reaction may be subjected to solid phase polymerization to obtain a polyamide resin composition having a higher viscosity.

The polycondensation reaction of the polyamide resin composition may be carried out with a batch reaction apparatus or a continuous reaction apparatus.

The polyamide resin composition of the invention preferably has a back pressure increasing coefficient K* satisfying the following equation (1):

$$0 < K^* < 15 \qquad (1)$$

wherein K* represents a back pressure increasing coefficient expressed by the following equation:

$$K^* = [\Delta P(\text{MPa})/T(\text{hr})]/[Q(\text{kg/hr})/S(\text{cm}^2)]$$

wherein the filter has a filtering diameter of 20 μm.

The polyamide resin composition is fused by using a uniaxial extruder (heater temperature: 285° C., average residence time: 10 minutes) and extruded in a given amount at a rate of from 3 to 6 g/min by using a gear pump. Foreign matters in the polymer are filtered with a filter having a filtering diameter of 20 μm, and the pressure on the secondary side of the gear pump is recorded with lapse of time. The difference in pressure after extruding for 4 hours is applied to the following equation to obtain the back pressure increasing value K*.

$$K^* = [\Delta P(\text{MPa})/T(\text{hr})]/[Q(\text{kg/hr})/S(\text{cm}^2)]$$

ΔP (MPa): (secondary pressure of gear pump after 4 hours)−(initial pressure)

T (hr): period of time of filtering the polyamide resin composition with the filter (4 hours)

Q (kg/hr): discharge amount of the polyamide resin composition (3 to 6 g/min)

S (cm$^2$): filtering area of the filter (1.538 cm$^2$)

The back pressure increasing value K* is preferably 10 or less, more preferably 8 or less, further preferably 7 or less, still further preferably 6 or less, and particularly preferably less than 5.

The lower limit of the back pressure increasing coefficient K* is preferably lowered to such a value that is equal to K* when no additive is mixed, and the K* value with no additive may be practically considered as one reference of the lower limit. The lower limit of K* is not particularly limited, and is 1 in one embodiment, 1.5 in another embodiment, 2 in still another embodiment, and 2.5 in a further embodiment.

In the case where the back pressure increasing coefficient K* is too high, the frequency of occurrence of clogging may be increased in a post-process requiring filtration with a filter, such as molding of a bottle and formation of a film, and there arises a high possibility of increase in cost due to deterioration in productivity.

In the case where K* is 5 or more and less than 15, slight filter clogging is observed but is not a level causing a practical problem, and the objects of the invention can be sufficiently attained. In the case where continuous production is carried out for a considerably long period of time, however, there may be a possibility of causing increased clogging, and thus K* is preferably less than 5 when continuous production is carried out for a considerably long period of time.

The back pressure increasing rate K* is more preferably 4 or less, further preferably 3.5 or less, and particularly preferably 3 or less. In the case where K* is too large, the frequency of occurrence of clogging may be increased in a post-process requiring filtration with a filter, such as molding of a bottle and formation of a film, and there arises a high possibility of increase in cost due to deterioration in productivity.

The lower limit of the back pressure increasing coefficient K* is preferably lowered to such a value that is equal to K* when no additive is mixed even in the case where a continuous production for a considerably long period of time is carried out, and the K* value with no additive may be practically considered as one reference of the lower limit. The lower limit of K* is not particularly limited, and is 1 in one embodiment, 1.5 in another embodiment, 2 in still another embodiment, and 2.5 in a further embodiment.

EXAMPLES

The invention will be illustrated with reference to the following Examples, but the invention shall not be construed as being limited to the examples. The measuring methods of the main characteristic values in the specification will be described below.

(1) Relative Viscosity of Polyamide Resin Composition (RV)

0.25 g of a specimen was dissolved in 25 mL of 96% sulfuric acid, and 10 mL of the resulting solution was measured with an Ostwald viscometer at 20° C. to obtain RV by the following equation.

$$RV = t/t_0$$

$t_0$: number of seconds of dropping solvent t: number of seconds of dropping specimen solution

(2) Color b of Polyamide Resin Composition

Color b was measured by using Model 100DP, produced by Nippon Denshoku Industries Co., Ltd. In the measurement method, chips were placed in a glass cell to a level of eight out of ten. After lightly shaking the cell to stuff densely, the resin was added until a lid could be closed, and then the lid was closed. The cell filled with the chips was placed on a sample stage and measured. Upon measurement, the chips were replaced and stuffed by every measurement. The measurement was carried out three times, and an average thereof was obtained.

(3) Analysis of P

A specimen was subjected to dry ashing decomposition by allowing to stand with sodium carbonate or to wet decomposition in a sulfuric acid-nitric acid-perchloric acid system or a sulfuric acid-perchloric acid system, to convert phosphorus to orthophosphoric acid. A molybdate salt was reacted therewith in a 1 mol/L sulfuric acid solution to form phosphomolybdic acid, which was reduced with hydrazine sulfate to form heteropoly blue. The absorbance of the heteropoly blue at 830 nm was measured with an absorptiometer (UV 150 02, produced by Shimadzu Corp.) for colorimetric determination.

(4) Analysis of Na and Li

A specimen was subjected to ashing decomposition in a platinum crucible, to which 6 mol/L hydrochloric acid was added, followed by subjecting to evaporation to dryness. The residue was dissolved with 1.2 mol/L hydrochloric acid, and the solution was subjected to quantitative determination by atomic absorption (AA-640-12, produced by Shimadzu Corp.).

(5) Back Pressure Increasing Test

A polyamide resin composition was fused by using a uniaxial extruder (heater temperature: 285° C., average residence time: 10 minutes) and extruded in a given amount at a rate of from 3 to 6 g/min by using a gear pump. Foreign matters in the polymer were filtered with a filter having a filtering diameter of 20 μm, and the pressure on the secondary side of the gear pump was recorded with lapse of time. The difference in pressure after extruding for 4 hours was applied to the following equation to obtain a back pressure increasing value K*.

$$K^* = [\Delta P(MPa)/T(hr)]/[Q(kg/hr)/S(cm^2)]$$

ΔP (MPa): (secondary pressure of gear pump after 4 hours)−(initial pressure)

T (hr): period of time of filtering the polyamide resin composition with the filter (4 hours)

Q (kg/hr): discharge amount of the polyamide resin composition (3 to 6 g/min)

S ($cm^2$): filtering area of the filter (8.166 $cm^2$)

m-Xylylene group-containing polyamide (MXD6) used in Examples and Comparative Examples, and Copolymers thereof

Example A-1

In a preparation vessel having an inner capacity of 250 L equipped with an agitator, a partial condenser, a thermometer, a dropping funnel and a nitrogen gas introducing tube, 27.66 kg of m xylylenediamine and 29.65 kg of adipic acid, which had been precisely weighed, were mixed at an inter temperature of 85° C. to obtain a transparent solution. 1.37 g of $NaH_2PO_2 \cdot H_2O$ and 3.71 g of $CH_3COONa$ as additives were added thereto, followed by agitating for 15 minutes. The resulting solution was transferred to a reaction vessel having an inner capacity of 270 L, and then reacted under stirring in conditions of an inner temperature of 190° C. and an inner pressure of 1.0 MPa. While water distilled was removed outside the system, at a time where the inner temperature became 235° C., the inner pressure was returned to ordinary pressure over 60 minutes. The inner temperature was gradually increased to 260° C. The solution was agitated at ordinary pressure, and the stirring operation was terminated when a target viscosity was obtained, followed by allowing to stand for 20 minutes. Thereafter, a molten resin was taken out from a discharge port at a lower part of the reaction vessel, and the resin was then solidified by cooling and cut with a strand cutter to obtain chips. The resulting resin had a relative viscosity (RV) of 2.10 and a Co-b value of 3.3. The resulting resin was dried in a 100 L blender at an inner temperature of 120° C. for 12 hours, and then cooled to obtain resin chips. The chips had a water content of 200 ppm and residual amounts of phosphorus atoms and sodium atoms were P=40 ppm and Na=134 ppm, respectively. The polyamide resin composition was fused by using a uniaxial extruder and extruded in a given amount at a rate of 6g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 2.5. Observation of the filter revealed that no clogging was found. Observation of the heat deterioration state of the resulting extrusion molded article revealed that no gelled product due to heat deterioration was observed.

Example A-2

The polymerization method of polyamide was carried out in the same manner as in Example A 1 except that 1.71 g of $NaH_2PO_2 \cdot H_2O$ and 3.97 g of $CH_3COONa$ as additives were added. The resulting resin had a relative viscosity (RV) of 2.23 and a Co-b value of 3.1. The resulting resin was dried in a 100 L blender at an inner temperature of 120° C. for 12 hours, and then cooled to obtain chips. The chips had a water content of 250 ppm and residual amounts of phosphorus atoms and sodium atoms were P=50 ppm and Na=148 ppm, respectively. The polyamide resin composition was fused by using a uniaxial extruder and extruded in a given amount at a rate of 6g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 3.5. Observation of the filter revealed that no clogging was found. Observation of the heat deterioration state of the resulting extrusion molded article revealed that no gelled product due to heat deterioration was observed.

Example A-3

The polymerization method of polyamide was carried out in the same manner as in Example Ai except that 3.42 g of $NaH_2PO_2.H_2O$ and 6.62 g of $CH_3COONa$ as additives were added. The resulting resin had a relative viscosity (RV) of 2.15 and a Co b value of −0.8. The resulting resin was dried in a 100 L blender at an inner temperature of 120° C. for 12 hours, further subjected to solid phase polymerization at an inner temperature of 180° C., and then cooled to obtain chips. The RV was 2.65, the Co-b value was −1.1, and the water content was 200 ppm, in this stage. The residual amounts of phosphorus atoms and sodium atoms were P=100 ppm and Na=260 ppm, respectively. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 14. Observation of the filter revealed that slight clogging was found but was in a level causing no practical problem. Observation of the heat deterioration state of the resulting extrusion molded article revealed that no gelled product due to heat deterioration was observed.

Example A-4

The polymerization method of polyamide was carried out in the same manner as in Example A-1 except that 3.42 g of $NaH_2PO_2.H_2O$ and 7.95 g of $CH_3COONa$ as additives were added. The resulting resin had a relative viscosity (RV) of 2.10 and a Co-b value of −0.9. The resulting resin was dried in a 100 L blender at an inner temperature of 120° C. for 12 hours, further subjected to solid phase polymerization at an inner temperature of 180° C., and then cooled to obtain chips. The RV was 2.65, the Co-b value was −1.3, and the water content was 200 ppm, in this stage. The residual amounts of phosphorus atoms and sodium atoms were P=100 ppm and Na=297 ppm, respectively. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 7.8. Observation of the filter revealed that slight clogging was found but was in a level causing no practical problem. Observation of the heat deterioration state of the resulting extrusion molded article revealed that no gelled product due to heat deterioration was observed.

Example A-5

The polymerization method of polyamide was carried out in the same manner as in Example A-1 except that 3.42 g of $NaH_2PO_2.H_2O$ and 10.59 g of $CH_3COONa$ as additives were added. The resulting resin had a relative viscosity (RV) of 2.12 and a Co-b value of 1.0. The resulting resin was dried in a 100 L blender at an inner temperature of 120° C. for 12 hours. The residual amounts of phosphorus and sodium atoms were P=100 ppm and Na=371 ppm, respectively, in this stage. The polyamide resin composition was fused by using a uniaxial extruder and extruded in a given amount at a rate of 6g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 3.7. Observation of the filter revealed that no clogging was found. Observation of the heat deterioration state of the resulting extrusion molded article revealed that no gelled product due to heat deterioration was observed.

Example A-6

The polymerization method of polyamide was carried out in the same manner as in Example A-1 except that 3.42 g of $NaH_2PO_2.H_2O$ and 0.59 g of $CH_3COONa$ as additives were added. The resulting resin had a relative viscosity (RV) of 2.12 and a Co-b value of 1.0. The resulting resin was dried in a 100 L blender at an inner temperature of 120° C. for 12 hours, further subjected to solid phase polymerization at an inner temperature of 180° C., and then cooled to obtain chips. The RV was 2.65, the Co-b value was 2.0, and the water content was 200 ppm, in this stage. The residual amounts of phosphorus atoms and sodium atoms were P=100 ppm and Na=371 ppm, respectively. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 4.5. Observation of the filter revealed that no clogging was found. Observation of the heat deterioration state of the resulting extrusion molded article revealed that no gelled product due to heat deterioration was observed.

Example A-7

The polymerization method of polyamide was carried out in the same manner as in Example A-1 except that 5.13 g of $NaH_2PO_2.H_2O$ and 15.89 g of $CH_3COONa$ as additives were added. The resulting resin had a relative viscosity (RV) of 2.15 and a Co-b value of −0.8. The resulting resin was dried in a 100 L blender at an inner temperature of 120° C. for 12 hours, further subjected to solid phase polymerization at an inner temperature of 180° C., and then cooled to obtain chips. The RV was 2.50, the Co-b value was 1.5, and the water content was 200 ppm, in this stage. The residual amounts of phosphorus atoms and sodium atoms were P=150 ppm and Na=557 ppm, respectively. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 5.2. Observation of the filter revealed that slight clogging was found but was in a level causing no practical problem. Observation of the heat deterioration state of the resulting extrusion molded article revealed that no gelled product due to heat deterioration was observed.

Example A-8

The polymerization method of polyamide was carried out in the same manner as in Example A-1 except that 6.50 g of $NaH_2PO_2.H_2O$ and 25.16 g of $CH_3COONa$ as additives were added. The resulting resin had a relative viscosity (RV) of 2.15 and a Co-b value of 3.5. The resulting resin was dried in a 100 L blender at an inner temperature of 120° C. for 12 hours, further subjected to solid phase polymerization at an inner temperature of 180° C., and then cooled to obtain chips. The RV was 2.10, the Co-b value was 2.5, and the water content was 250 ppm, in this stage. The residual amounts of phosphorus atoms and sodium atoms were P=190 ppm and Na=846 ppm, respectively. The polyamide resin composition was fused by using a uniaxial extruder and extruded in a given amount at a rate of 6g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 4.0. Observation of the filter revealed that no clogging was found. Observation of the heat deterioration state of the resulting extrusion molded article revealed that no gelled product due to heat deterioration was observed.

Example A-9

In a preparation vessel having an inner capacity of 250 L equipped with an agitator, a partial condenser, a thermometer, a dropping funnel and a nitrogen gas introducing tube, 27.66 kg of m-xylylenediamine, 26.41 kg of adipic acid and 3.34 kg of terephthalic acid, which had been precisely weighed, were mixed at an inter temperature of 100° C. to obtain a transparent solution. 5.13 g of $NaH_2PO_2.H_2O$ and 13.91 g of $CH_3COONa$ as additives were added thereto, followed by agitating for 15 minutes. The resulting solution was transferred to a reaction vessel having an inner capacity of 270 L, and then reacted under stirring in conditions of an inner temperature of 190° C. and an inner pressure of 1.0 MPa. While water distilled was removed outside the system, at a time where the inner temperature became 235° C., the inner pressure was returned to ordinary pressure over 60 minutes. The inner temperature was gradually increased to 260° C. The solution was agitated at ordinary pressure, and the stirring operation was terminated when a target viscosity was obtained, followed by allowing to stand for 20 minutes. Thereafter, a molten resin was taken out from a discharge port at a lower part of the reaction vessel, and the resin was then solidified by cooling and cut with a strand cutter to obtain resin chips. The resulting resin had a relative viscosity (RV) of 2.35 and a Co-b value of 4.9. The residual amounts of phosphorus atoms and sodium atoms were P=150 ppm and Na=501 ppm, respectively. The resulting resin was dried in a 100 L blender at an inner temperature of 120° C. for 12 hours, and then cooled to obtain chips. The RV was 2.35, the Co-b value was 4.9, and the water content was 250 ppm, in this stage. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 14. Observation of the filter revealed that slight clogging was found but was in a level causing no practical problem. Observation of the heat deterioration state of the resulting extrusion molded article revealed that no gelled product due to heat deterioration was observed.

Example A-10

In a preparation vessel having an inner capacity of 250 L equipped with an agitator, a partial condenser, a thermometer, a dropping funnel and a nitrogen gas introducing tube, 27.66 kg of m-xylylenediamine, 26.41 kg of adipic acid and 3.45 kg of cyclohexanedicarboxylic acid, which had been precisely weighed, were mixed at an inter temperature of 100° C. to obtain a transparent solution. 5.13 g of $NaH_2PO_2.H_2O$ and 13.91 g of $CH_3COONa$ as additives were added thereto, followed by agitating for 15 minutes. The resulting solution was transferred to a reaction vessel having an inner capacity of 270 L, and then reacted under stirring in conditions of an inner temperature of 190° C. and an inner pressure of 1.0 MPa. While water distilled was removed outside the system, at a time where the inner temperature became 235° C., the inner pressure was returned to ordinary pressure over 60 minutes. The inner temperature was gradually increased to 260° C. The solution was agitated at ordinary pressure, and the stirring operation was terminated when a target viscosity was obtained, followed by allowing to stand for 20 minutes. Thereafter, a molten resin was taken out from a discharge port at a lower part of the reaction vessel, and the resin was then solidified by cooling and cut with a strand cutter to obtain resin chips. The resulting resin had a relative viscosity (RV) of 2.3 and a Co-b value of −3.1. The residual amounts of phosphorus atoms and sodium atoms were P<150 ppm and Na=501 ppm, respectively. The resulting resin was dried in a 100 L blender at an inner temperature of 120° C. for 12 hours, and then cooled to obtain chips. The RV was 2.30, the Co-b value was −2.3, and the water content was 250 ppm, in this stage. The polyamide resin composition was fused by using a uniaxial extruder and extruded in a given amount at a rate of 6 g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 12. Observation of the filter revealed that slight clogging was found but was in a level causing no practical problem. Observation of the heat deterioration state of the resulting extrusion molded article revealed that no gelled product due to heat deterioration was observed.

Example B-1

In a preparation vessel having an inner capacity of 250 L equipped with an agitator, a partial condenser, a thermometer, a dropping funnel and a nitrogen gas introducing tube, 27.66 kg of m-xylylenediamine and 29.65 kg of adipic acid, which had been precisely weighed, were mixed at an inter temperature of 85° C. to obtain a transparent solution. 0.07 g of $NaH_2PO_2.H_2O$ and 0.17 g of $CH_3COONa$ as additives were added thereto, followed by agitating for 15 minutes. The resulting solution was transferred to a reaction vessel having an inner capacity of 270 L, and then reacted under stirring in conditions of an inner temperature of 190° C. and an inner pressure of 1.0 MPa. While water distilled was removed outside the system, at a time where the inner temperature became 235° C., the inner pressure was returned to ordinary pressure over 60 minutes. The inner temperature was gradually increased to 260° C. The solution was agitated at ordinary pressure, and the stirring operation was terminated when a target viscosity was obtained, followed by allowing to stand for 20 minutes. Thereafter, a molten resin was taken out from a discharge port at a lower part of the reaction vessel, and the resin was then solidified by cooling and cut with a strand cutter to obtain resin chips. The resulting resin had a relative viscosity (RV) of 2.10 and a Co-b value of 5.5. The resulting resin was dried in a 100 L blender at an inner temperature of 120° C. for 12 hours, further subjected to solid phase polymerization at an inner temperature of 180° C., and then cooled to obtain chips. The RV was 2.65, the Co-b value was 6.5, and the water content was 200 ppm, in this stage. The residual amounts of phosphorus atoms and sodium atoms were P=1 ppm and Na=1 ppm, respectively. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 3.0. Observation of the filter revealed that no clogging was found. Observation of the heat deterioration state of the resulting extrusion molded article revealed that no gelled product due to heat deterioration was observed.

Example B-2

The polymerization method of polyamide was carried out in the same manner as in Example B-1. Sodium from water used in a cooling step was intentionally made remain in the resin, and the effect of sodium as an additive was evaluated. The resulting resin had a relative viscosity (RV) of 2.15 and a Co-b value of 7.8. The resulting resin was dried in a 100 L blender at an inner temperature of 120° C. for 12 hours, further subjected to solid phase polymerization at an inner temperature of 180° C., and then cooled to obtain chips. The RV was 2.65, the Co-b value was 7.8, and the water content was 200 ppm, in this stage. The residual amounts of phosphorus atoms and sodium atoms were P 0 ppm and Na=0.1 ppm, respectively. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 2.2. Observation of the filter revealed that no clogging was found. Observation of the heat deterioration state of the resulting extrusion molded article revealed that no gelled product due to heat deterioration was observed.

Example B-3

The polymerization method of polyamide was carried out in the same manner as in Example B-1 except that 0.33 g of $NaH_2PO_2 \cdot H_2O$ and 0.86 g of $CH_3COONa$ as additives were added. The resulting resin had a relative viscosity (RV) of 2.15 and a Co-b value of 5.6. The resulting resin was dried in a 100 L blender at an inner temperature of 120° C. for 12 hours, further subjected to solid phase polymerization at an inner temperature of 180° C., and then cooled to obtain chips. The RV was 2.65, the Co-b value was 6.2, and the water content was 200 ppm, in this stage. The residual amounts of phosphorus atoms and sodium atoms were P=5 ppm and Na=5 ppm, respectively. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 3.9. Observation of the filter revealed that no clogging was found. Observation of the heat deterioration state of the resulting extrusion molded article revealed that no gelled product due to heat deterioration was observed.

Example B-4

The polymerization method of polyamide was carried out in the same manner as in Example B-1 except that 1.54 g of $NaH_2PO_2 \cdot H_2O$ and 0.59 g of $CH_3COONa$ as additives were added. The resulting resin had a relative viscosity (RV) of 2.15 and a Co-b value of 5.3. The resulting resin was dried in a 100 L blender at an inner temperature of 120° C. for 12 hours, and then cooled to obtain chips. The water content was 200 ppm in this stage. The residual amounts of phosphorus atoms and sodium atoms were P=9 ppm and Na=9 ppm, respectively. The polyamide resin composition was fused by using a uniaxial extruder and extruded in a given amount at a rate of 6g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 4.6. Observation of the filter revealed that no clogging was found. Observation of the heat deterioration state of the resulting extrusion molded article revealed that no gelled product due to heat deterioration was observed.

Example B-5

The polymerization method of polyamide was carried out in the same manner as in Example B-1 except that 2.6 g of $NaH_2PO_2 \cdot H_2O$ and 0.9 g of $CH_3COONa$ as additives were added. The resulting resin had a relative viscosity (RV) of 2.15 and a Co-b value of 3.5. The resulting resin was dried in a 100 L blender at an inner temperature of 120° C. for 12 hours, further subjected to solid phase polymerization at an inner temperature of 180° C., and then cooled to obtain chips. The RV was 2.65, the Co-b value was 3.6, and the water content was 200 ppm, in this stage. The residual amounts of phosphorus atoms and sodium atoms were P=15 ppm and Na=15 ppm, respectively. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 3.7. Observation of the filter revealed that no clogging was found. Observation of the heat deterioration state of the resulting extrusion molded article revealed that no gelled product due to heat deterioration was observed.

Example B-6

In a preparation vessel having an inner capacity of 250 L equipped with an agitator, a partial condenser, a thermometer, a dropping funnel and a nitrogen gas introducing tube, 27.66 kg of m-xylylenediamine, 26.41 kg of adipic acid and 3.34 kg of terephthalic acid, which had been precisely weighed, were mixed at an inter temperature of 100° C. to obtain a transparent solution. 1.54 g of $NaH_2PO_2 \cdot H_2O$ and 0.8 g of $CH_3COONa$ as additives were added thereto, followed by agitating for 15 minutes. The resulting solution was transferred to a reaction vessel having an inner capacity of 270 L, and then reacted under stirring in conditions of an inner temperature of 190° C. and an inner pressure of 1.0 MPa. While water distilled was removed outside the system, at a time where the inner temperature became 235° C., the inner pressure was returned to ordinary pressure over 60 minutes. The inner temperature was gradually increased to 260° C. The solution was agitated at ordinary pressure, and the stirring operation was terminated when a target viscosity was obtained, followed by allowing to stand for 20 minutes. Thereafter, a molten resin was taken out from a discharge port at a lower part of the reaction vessel, and the resin was then solidified by cooling and cut with a strand cutter to obtain resin chips. The resulting resin had a relative viscosity (RV) of 2.2 and a Co-b value of 7.9. The residual amounts of phosphorus atoms and sodium atoms were P=9 ppm and Na=10 ppm, respectively. The resulting resin was dried in a 100 L blender at an inner temperature of 120° C. for 12 hours, and then cooled to obtain chips. The RV was 2.25, the Co-b value was 9.9, and the water content was 250 ppm, in this stage. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 3.8. Observation of the filter revealed that no clogging was found. Observation of the heat deterioration state of the resulting extrusion molded article revealed that no gelled product due to heat deterioration was observed.

Example B-7

In a preparation vessel having an inner capacity of 250 L equipped with an agitator, a partial condenser, a thermometer, a dropping funnel and a nitrogen gas introducing tube, 27.66 kg of m-xylylenediamine, 26.41 kg of adipic acid and 3.45 kg of cyclohexanedicarboxylic acid, which had been precisely weighed, were mixed at an inter temperature of 100° C. to obtain a transparent solution. 1.54 g of $NaH_2PO_2.H_2O$ and 0.8 g of $CH_3COONa$ as additives were added thereto, followed by agitating for 15 minutes. The resulting solution was transferred to a reaction vessel having an inner capacity of 270 L, and then reacted under stirring in conditions of an inner temperature of 190° C. and an inner pressure of 1.0 MPa. While water distilled was removed outside the system, at a time where the inner temperature became 235° C., the inner pressure was returned to ordinary pressure over 60 minutes. The inner temperature was gradually increased to 260° C. The solution was agitated at ordinary pressure, and the stirring operation was terminated when a target viscosity was obtained, followed by allowing to stand for 20 minutes. Thereafter, a molten resin was taken out from a discharge port at a lower part of the reaction vessel, and the resin was then solidified by cooling and cut with a strand cutter to obtain resin chips. The resulting resin had a relative viscosity (RV) of 2.3 and a Co-b value of 6.6. The residual amounts of phosphorus atoms and sodium atoms were P=9 ppm and Na=10 ppm, respectively. The resulting resin was dried in a 100 L blender at an inner temperature of 120° C. for 12 hours, and then cooled to obtain chips. The RV was 2.30, the Co-b value was 6.9, and the water content was 250 ppm, in this stage. The polyamide resin composition was fused by using a uniaxial extruder and extruded in a given amount at a rate of 6g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 2.8. Observation of the filter revealed that no clogging was found. Observation of the heat deterioration state of the resulting extrusion molded article revealed that no gelled product due to heat deterioration was observed.

Example B-8

The polymerization method of polyamide was carried out in the same manner as in Example B-1 except that 0.53 g of $H_3PO_2$ and 1.5 g of $LiOH.H_2O$ as additives were added. The resulting resin had a relative viscosity (RV) of 2.15 and a Co-b value of 9.2. The resulting resin was dried in a 100 L blender at an inner temperature of 120° C. for 12 hours, further subjected to solid phase polymerization at an inner temperature of 180° C., and then cooled to obtain chips. The RV was 2.67, the Co-b value was 9.4, and the water content was 200 ppm, in this stage. The residual amounts of phosphorus atoms, sodium atoms and lithium atoms were P 5 ppm, Na=0.1 ppm and Li=5 ppm, respectively. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 2.2. Observation of the filter revealed that no clogging was found. Observation of the heat deterioration state of the resulting extrusion molded article revealed that no gelled product due to heat deterioration was observed.

Example B-9

The polymerization method of polyamide was carried out in the same manner as in Example B-1 except that 0.53 g of $H_3PO_2$ and 0.8 g of KOH as additives were added. The resulting resin had a relative viscosity (RV) of 2.10 and a Co-b value of 8.9. The resulting resin was dried in a 100 L blender at an inner temperature of 120° C. for 12 hours, further subjected to solid phase polymerization at an inner temperature of 180° C., and then cooled to obtain chips. The RV was 2.62, the Co-b value was 9.2, and the water content was 200 ppm, in this stage. The residual amounts of phosphorus atoms, sodium atoms and potassium atoms were P 5 ppm, Na=0.1 ppm and K=5 ppm, respectively. The polyamide resin composition was fused by using a uniaxial extruder and extruded in a given amount at a rate of 3g/min by using a gear pump. Foreign matters in the polymer were filtered with a filter having a filtering diameter of 20.1 μm, and the pressure on the secondary side of the gear pump was recorded with lapse of time. The back pressure increasing coefficient K* after extruding for 4 hours was 3.8. Observation of the filter revealed that no clogging was found. Observation of the heat deterioration state of the resulting extrusion molded article revealed that no gelled product due to heat deterioration was observed.

Reference Example 1

The polymerization method of polyamide was carried out in the same manner as in Example B-1 except that 0.86 g of $NaH_2PO_2.H_2O$ and 2.65 g of $CH_3COONa$ as additives were added. The resulting resin had a relative viscosity (RV) of 2.11 and a Co-b value of 5.0. The resulting resin was dried in a 100 L blender at an inner temperature of 120° C. for 12 hours, and then cooled to obtain chips. The chips had a water content of 250 ppm. The residual amounts of phosphorus atoms and sodium atoms were P=25 ppm and Na=93 ppm, respectively. The polyamide resin composition was fused by using a uniaxial extruder and extruded in a given amount at a rate of 6g/min by using a gear pump. Foreign matters in the polymer were filtered with a filter having a filtering diameter of 20.1 μm, and the pressure on the secondary side of the gear pump was recorded with lapse of time. The back pressure increasing coefficient K* after extruding for 4 hours was 4.5. Observation of the filter revealed that clogging was found. Observation of the heat deterioration state of the resulting extrusion molded article revealed that no gelled product due to heat deterioration was observed.

The polymerization method of polyamide was carried out in the same manner as in Example B-1 except that 5.1 g of $NaH_2PO_2 \cdot H_2O$ and 4.0 g of $CH_3COONa$ as additives were added. The resulting resin had a relative viscosity (RV) of 2.15 and a Co-b value of 3.4. The resulting resin was dried in a 100 L blender at an inner temperature of 120° C. for 12 hours, further subjected to solid phase polymerization at an inner temperature of 180° C., and then cooled to obtain chips. The RV was 2.65, the Co-b value was 3.8, and the water content was 200 ppm, in this stage. The residual amounts of phosphorus atoms and sodium atoms were P=30 ppm and Na=45 ppm, respectively. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure of the secondary side of the gear pump was recorded with lapse of time. The back pressure increasing coefficient K* after extruding for 4 hours was 6.0. Observation of the filter revealed that slight clogging was found but was in a level causing no practical problem. Observation of the heat deterioration state of the resulting extrusion molded article revealed that no gelled product due to heat deterioration was observed.

Comparative Example 1

The polymerization method of polyamide was carried out in the same manner as in Example A-1 except that 6.84 g of $NaH_2PO_2 \cdot H_2O$ and 10.59 g of $CH_3COONa$ as additives were added. The resulting resin had a relative viscosity (RV) of 2.15 and a Co-b value of −2.2. The resulting resin was dried in a 100 L blender at an inner temperature of 120° C. for 12 hours, further subjected to solid phase polymerization at an inner temperature of 180° C., and then cooled to obtain chips. The RV was 2.65, the Co-b value was −2.9, and the water content was 200 ppm, in this stage. The residual amounts of phosphorus atoms and sodium atoms were P=200 ppm and Na=440 ppm, respectively. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 20. Observation of the filter revealed that clogging was found. Observation of the heat deterioration state of the resulting extrusion molded article revealed that no gelled product due to heat deterioration was observed.

Comparative Example 2

The polymerization method of polyamide was carried out in the same manner as in Example A-1 except that 4.55 g of $NaH_2PO_2 \cdot H_2O$ and 3.52 g of $CH_3COONa$ as additives were added. The resulting resin had a relative viscosity (RV) of 2.15 and a Co-b value of −1.0. The resulting resin was dried in a 100 L blender at an inner temperature of 120° C. for 12 hours, further subjected to solid phase polymerization at an inner temperature of 180° C., and then cooled to obtain chips. The RV was 2.65, the Co-b value was −1.7, and the water content was 200 ppm, in this stage. The residual amounts of phosphorus atoms and sodium atoms were P=133 ppm and Na=190 ppm, respectively. The polyamide resin composition was fused by using a uniaxial extruder and extruded in a given amount at a rate of 3g/min by using a gear pump. Foreign matters in the polymer were filtered with a filter having a filtering diameter of 20.1 μm, and the pressure on the secondary side of the gear pump was recorded with lapse of time. The back pressure increasing coefficient K* after extruding for 4 hours was 29. Observation of the filter revealed that clogging was found. Observation of the heat deterioration state of the resulting extrusion molded article revealed that gelled products due to heat deterioration were observed.

Comparative Example 3

The polymerization method of polyamide was carried Out in the same manner as in Example A-1 except that 5.13 g of $NaH_2PO_2 \cdot H_2O$ and 3.42 g of $CH_3COONa$ as additives were added. The resulting resin had a relative viscosity (RV) of 2.15 and a Co-b value of −1.0. The resulting resin was dried in a 100 L blender at an inner temperature of 120° C. for 12 hours, further subjected to solid phase polymerization at an inner temperature of 180° C., and then cooled to obtain chips. The RV was 2.65, the Co-b value was −1.5, and the water content was 200 ppm, in this stage. The residual amounts of phosphorus atoms and sodium atoms were P=100 ppm and Na=220 ppm, respectively. The polyamide resin composition was fused by using a uniaxial extruder and extruded in a given amount at a rate of 3g/min by using a gear pump. Foreign matters in the polymer were filtered with a filter having a filtering diameter of 20 μm, and the pressure on the secondary side of the gear pump was recorded with lapse of time. The back pressure increasing coefficient K* after extruding for 4 hours was 17. Observation of the filter revealed that clogging was found. Observation of the heat deterioration state of the resulting extrusion molded article revealed that gelled products due to heat deterioration were observed.

TABLE 1

| | Dicarboxylic acid/diamine (mol %) | P atom (ppm) | Alkali metal atom (M) Species | (ppm) | M/P molar ratio | RV | Color b | Back pressure increasing coefficient K* | Filter clogging | State of heat deterioration |
|---|---|---|---|---|---|---|---|---|---|---|
| Example a-1 | AA//MXDA 100//100 | 40 | Na | 134 | 4.5 | 2.10 | 3.3 | 2.5 | AA | A |
| Example a-2 | AA//MXDA 100//100 | 50 | Na | 148 | 4.0 | 2.23 | 3.1 | 3.5 | AA | A |

TABLE 1-continued

|  | Dicarboxylic acid/diamine (mol %) | P atom (ppm) | Alkali metal atom (M) | | M/P molar ratio | RV | Color b | Back pressure increasing coefficient K* | Filter clogging | State of heat deterioration |
| --- | --- | --- | --- | --- | --- | --- | --- | --- | --- | --- |
|  |  |  | Species | (ppm) |  |  |  |  |  |  |
| Example a-3 | AA//MXDA 100//100 | 100 | Na | 260 | 3.5 | 2.65 | −1.1 | 14 | A | A |
| Example a-4 | AA//MXDA 100//100 | 100 | Na | 297 | 4.0 | 2.65 | −1.3 | 7.8 | A | A |
| Example a-5 | AA//MXDA 100//100 | 100 | Na | 371 | 5.0 | 2.12 | 1.0 | 3.7 | AA | A |
| Example a-6 | AA//MXDA 100//100 | 100 | Na | 371 | 5.0 | 2.65 | 2.0 | 4.5 | AA | A |
| Example a-7 | AA//MXDA 100//100 | 150 | Na | 557 | 5.0 | 2.50 | 1.5 | 5.2 | A | A |
| Example a-8 | AA//MXDA 100//100 | 190 | Na | 846 | 6.0 | 2.1 | 2.5 | 4.0 | AA | A |
| Example a-9 | AA/TPA/MXDA 90/10/100 | 150 | Na | 501 | 4.5 | 2.35 | 4.9 | 14 | A | A |
| Example a-10 | AA/CHDA/MXDA 90/10/100 | 150 | Na | 501 | 4.5 | 2.30 | −2.3 | 12 | A | A |
| Reference Example b-1 | AA//MXDA 100//100 | 1 | Na | 1 | — | 2.65 | 6.5 | 3.0 | AA | A |
| Reference Example b-2 | AA//MXDA 100//100 | 0 | Na | 0.1 | — | 2.65 | 7.8 | 2.2 | AA | A |
| Reference Example b-3 | AA//MXDA 100//100 | 5 | Na | 5 | — | 2.65 | 6.2 | 3.9 | AA | A |
| Reference Example b-4 | AA//MXDA 100//100 | 9 | Na | 9 | — | 2.15 | 5.3 | 4.6 | AA | A |
| Reference Example b-5 | AA//MXDA 100//100 | 15 | Na | 15 | — | 2.65 | 3.6 | 4.5 | AA | A |
| Reference Example b-6 | AA/TPA/MXDA 90/10/100 | 9 | Na | 10 | — | 2.25 | 9.9 | 3.8 | AA | A |
| Reference Example b-7 | AA/CHDA/MXDA 90/10/100 | 9 | Na | 10 | — | 2.30 | 6.9 | 2.8 | AA | A |
| Reference Example b-8 | AA//MXDA 100//100 | 5 | Li Na | 5 0.1 | — | 2.67 | 9.4 | 2.2 | AA | A |
| Reference Example b-9 | AA/TPA/MXDA 90/10/100 | 5 | K Na | 5 0.1 | — | 2.62 | 9.2 | 3.8 | AA | A |
| Reference example 1 | AA//MXDA 100//100 | 25 | Na | 93 | 5.0 | 2.11 | 5.0 | 4.5 | AA | A |
| Reference example 2 | AA//MXDA 100//100 | 30 | Na | 45 | — | 2.65 | 3.8 | 6.0 | A | A |
| Comparative example 1 | AA//MXDA 100//100 | 200 | Na | 440 | 3.0 | 2.65 | −2.9 | 20 | B | A |
| Comparative example 2 | AA//MXDA 100//100 | 133 | Na | 190 | 2.0 | 2.61 | −1.7 | 29 | B | B |
| Comparative example 3 | AA//MXDA 100//100 | 100 | Na | 220 | 3.0 | 2.65 | −1.5 | 17 | B | B |

NOTE
AA: adipic acid
TPA: terephthalic acid
CHDA: 1,4-cyclohexanedicarboxylic acid
MXDA: m-xylylenediamine
The Co-b values were those after drying and solid phase polymerization.
Filter clogging
AA: No clogging was found.
A: Slight clogging was found but was in a level causing no practical problem.
B: Clogging was found.
State of heat deterioration
A: No gelled product was found.
B: Gelled products were found.

INDUSTRIAL APPLICABILITY

The polyamide resin composition of the invention is good in heat stability upon molding, is excellent in color tone, and suffers less increase in filter back pressure. The invention is suitably used as a material of a gasoline tank and a material of a molded article, such as a hollow molded container including a beverage bottle, a film and a sheet, and can produce them with high productivity.

The invention claimed is:

1. A polyamide resin composition comprising m-xylylenediamine (MXDA) as a diamine component and adipic acid (AA) as a dicarboxylic acid component, wherein the polyamide resin composition has:

a content of phosphorus atoms (P) and sodium atoms (Na) satisfying the following equations (3) and (4):

$$30 \leq P \leq 190 \text{ ppm} \quad (3)$$

$$3.5 \leq Na/P \text{ (molar ratio)} < 7.0 \quad (4)$$

and a back pressure increasing coefficient K* satisfying the following equation (1):

$$0 < K^* \leq 14 \quad (1)$$

wherein K* represents a back pressure increasing coefficient expressed by the following equation:

$$K^* = [\Delta P(MPa)/T(hr)]/[Q(kg/hr)/S(cm^2)]$$

wherein ΔP (MPa) represents a difference between an initial secondary pressure of a gear pump and a secondary pressure thereof after a lapse of T (hr); T (hr) represents a period of time of filtering the polyamide resin composition with a filter; Q (kg/hr) represents a discharge amount of the polyamide resin composition; S (cm$^2$) represents a filtering area of the filter; and the filter has a filtering diameter of 20 μm.

2. The polyamide resin composition described in claim 1, wherein the polyamide resin composition has a back pressure increasing coefficient K* satisfying the following equation (2):

$$0 < K^* < 5 \quad (2)$$

wherein K* represents a back pressure increasing coefficient expressed by the following equation:

$$K^* = [\Delta P(MPa)/T(hr)]/[Q(kg/hr)/S(cm^2)]$$

wherein ΔP (MPa) represents a difference between an initial secondary pressure of a gear pump and a secondary pressure thereof after a lapse of T (hr); T (hr) represents a period of time of filtering the polyamide resin composition with a filter; Q (kg/hr) represents a discharge amount of the polyamide resin composition; S (cm$^2$) represents a filtering area of the filter; and the filter has a filtering diameter of 20 μm.

3. The polyamide resin composition as described in claim 1, wherein the polyamide resin composition has a Co-b value satisfying the following equation (5):

$$-3 < Co\text{-}b < 10 \quad (5).$$

4. The polyamide resin composition of claim 1, wherein the back pressure increasing coefficient K* is 10 or less.

5. The polyamide resin composition of claim 1, wherein the back pressure increasing coefficient K* is 8 or less.

6. The polyamide resin composition of claim 1, wherein the back pressure increasing coefficient K* is 7 or less.

7. The polyamide resin composition of claim 1, wherein the back pressure increasing coefficient K* is 6 or less.

8. The polyamide resin composition of claim 1, wherein the back pressure increasing coefficient K* is 5 or less.

* * * * *